H. M. PLAISTED.
DUST COLLECTOR.
APPLICATION FILED APR. 8, 1919.

1,356,086.

Patented Oct. 19, 1920.
4 SHEETS—SHEET 3.

Inventor
Harold M. Plaisted

H. M. PLAISTED.
DUST COLLECTOR.
APPLICATION FILED APR. 8, 1919.

1,356,086.

Patented Oct. 19, 1920.

Inventor
Harold M. Plaisted

UNITED STATES PATENT OFFICE.

HAROLD M. PLAISTED, OF ST. LOUIS, MISSOURI, ASSIGNOR TO WILLIAMS PATENT CRUSHER AND PULVERIZER COMPANY, OF ST. LOUIS, MISSOURI, A CORPORATION OF MISSOURI.

DUST-COLLECTOR.

1,356,086.

Specification of Letters Patent.

Patented Oct. 19, 1920.

Application filed April 8, 1919. Serial No. 288,480.

*To all whom it may concern:*

Be it known that I, HAROLD M. PLAISTED, a citizen of the United States, residing at St. Louis, State of Missouri, have invented certain new and useful Improvements in Dust-Collectors, of which the following is a specification.

This invention relates to certain new and useful improvements in dust collectors the peculiarities of which will be hereinafter fully described and claimed.

A main object of my invention is to provide means for reversing the direction of currents of dust laden air passing through screens, without materially checking said currents, or reducing the screening area; also for effecting such change automatically at regular intervals of time; and further, for jarring the screens automatically at regular intervals.

In previous constructions of dust collectors, a portion of the screen area is shut off from the normal action of the dust laden air and a reverse current of air from the outside is sent through the cut off screen in a reverse direction to loosen the dust on one side thereof; also a duplicate arrangement of screen compartments has been provided whereby one set of compartments may be cut off from the action of the air while being jarred to loosen the dust from one side thereof, and another construction similar in which the outside air is drawn reversely through the screen from outside while the dust laden air is shut off.

In my improved construction I provide screens or other reticular partitions and direct the dust laden air alternately to both sides of the screen, thus maintaining in use the whole screen area and loosening the collected dust from both sides of the screen without taking in outside air or materially checking the velocity of the air current carrying said dust; I also provide an automatic device for effecting the reversal of the dust laden air currents through the screens at regular intervals of time; and also jar the screen area at lesser time intervals automatically.

In the accompanying drawings on which like reference letters indicate corresponding parts.

Referring to the drawings, the letter A designates suitable posts or standards connected by cross rails B at the sides and transverse rails C at the front and rear forming a rectangular frame, between which are mounted and properly fastened to the side rails, a series of frames D connected by top and bottom strips E and F respectively and by intermediate cross strips G preferably in pairs, between which strips are mounted a series of parallel screens $y$ forming reticular partitions, that are stiffened and supported by said cross strips, and are secured to the meeting edges of the side section frames *D*, or otherwise, so as to provide a series of passages through which are directed currents of dust laden air from the inlet ends of said passages at the bottom, to the outlet ends at the top, in the construction shown.

Figure 2:
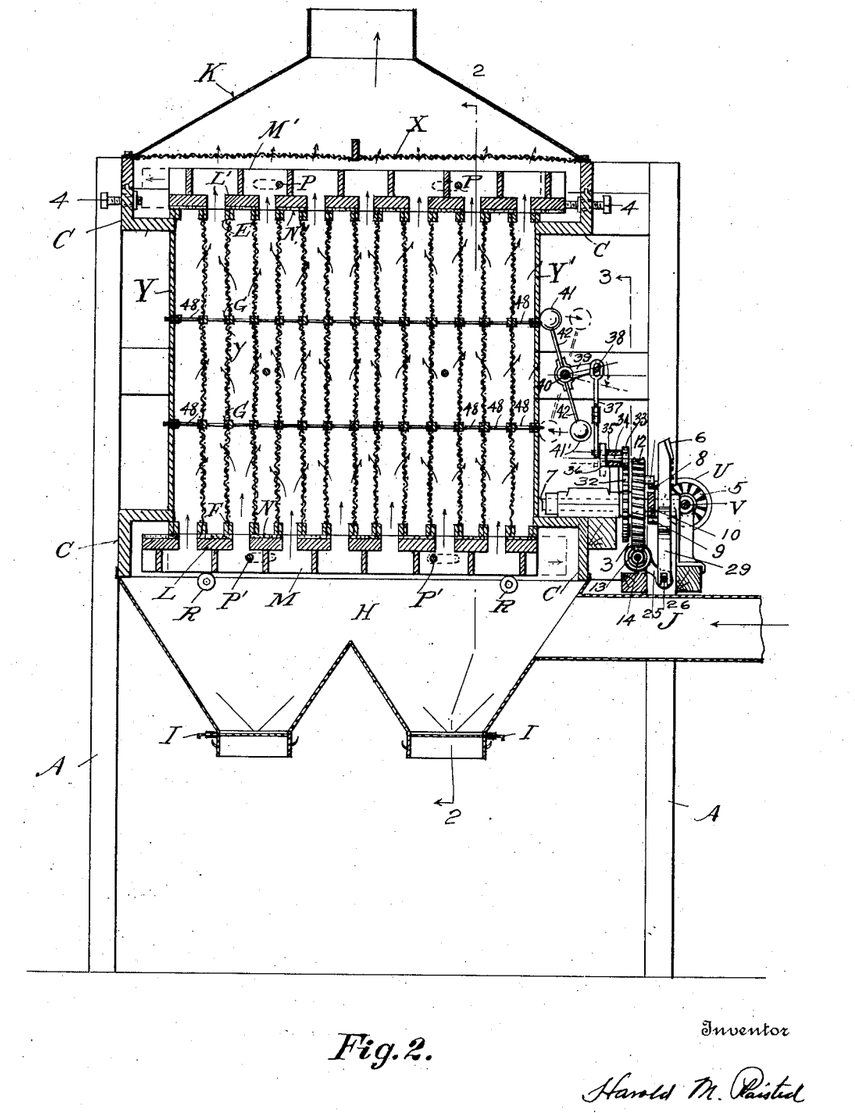
Fig. 2 a vertical central elevation, the section being taken parallel to the sides and showing air tight walls and a hood on top the filter house adapting it to a suction system.

The inlet and outlet openings to said passages may be otherwise located, but in the construction shown the partitions are vertical and with the walls of the inclosing casing formed by the side frames D and the front and back walls, constitute through passages for the passage of dust laden air. The bottom cross rails B and C between the posts A support a hopper H preferably double and each leg provided with a cut off slide I or other closing means and having an entrance J for the dust laden air to enter this hopper below the reticular partitions. A hood K is preferably located above and inclosing the outlet ends of said passages and is supported by the upper cross rails as shown in Fig. 2 for the exit of the practically pure air or air that is practically free from its dust after passing through the reticular partitions in a manner now to be described. This hood may be left off except when the suction system is used to draw the air through the filter house between the reticular partitions. It may also be used in the blast system if desired.

When dust laden air under pressure, as in a blast system, is delivered through the entrance J to the hopper H it will pass into the inlet ends of alternate passages when the other passages at their inlet ends are closed by a grid valve or other suitable means for temporarily closing said inlet ends. As shown, these valves consist of bars L supported by suitable side pieces M and spaced a distance apart corresponding to the openings between the cross strips F. Between said bars and cross strips I provide a packing layer N whereby the inlet end of every other passage is temporarily closed when the cross bars L are adjusted as shown in Fig. 2. A similar grid valve (L' M' N') or other suitable means is mounted at the outlet ends of said passages and temporarily closes the outlet ends of alternate passages, and when adjusted as in Fig. 2, the outlet valve alternates with the inlet valve so that when the inlet end of any passage is open the outlet end of the same passage is closed, and vice versa. It is evident therefore that the air entering the open inlet ends of alternate passages will find the outlet ends of said passages closed temporarily by the upper valve and will seek outlet through the reticular partitions into the adjacent passages on either side which have their outlets open. It is likewise evident that by shifting the lower valve so as to close the inlet ends now open, the inlet ends of alternate passages will be opened and those previously opened will be closed. Likewise when the other valve is shifted and the outlet ends of alternate passages are closed while the inlet ends of the same passages have been opened by the lower valve, the dust laden air currents pass up alternate passages by means of inlets previously closed but now open; and since said passages receiving the dust laden air are now closed at their outer ends, the dust laden air is set through the partitions in a reverse direction in seeking the outlet openings in adjacent passages. By this reversal of the dust laden air currents from one side of the reticular partitions to the other side of said partitions, the dust deposited upon the first side of the partition will be now driven off by the dust laden air passing through the screen in the reverse direction, and will fall upon the grid bars closing temporarily the lower or inlet ends of the passages that have temporarily their outlet ends open. Upon the next shift of the valves the deposited dust will be scraped off by the bars F and drop into the hopper H. This shift is made very quickly, and even should some of the dust previously deposited on the grid bar be caught up by the entering air current, it could not escape at the top, because the upper grid bar would have closed the outlet at the same time, or slightly before the bottom end became an inlet, as will be more fully described later.

Figure 1:
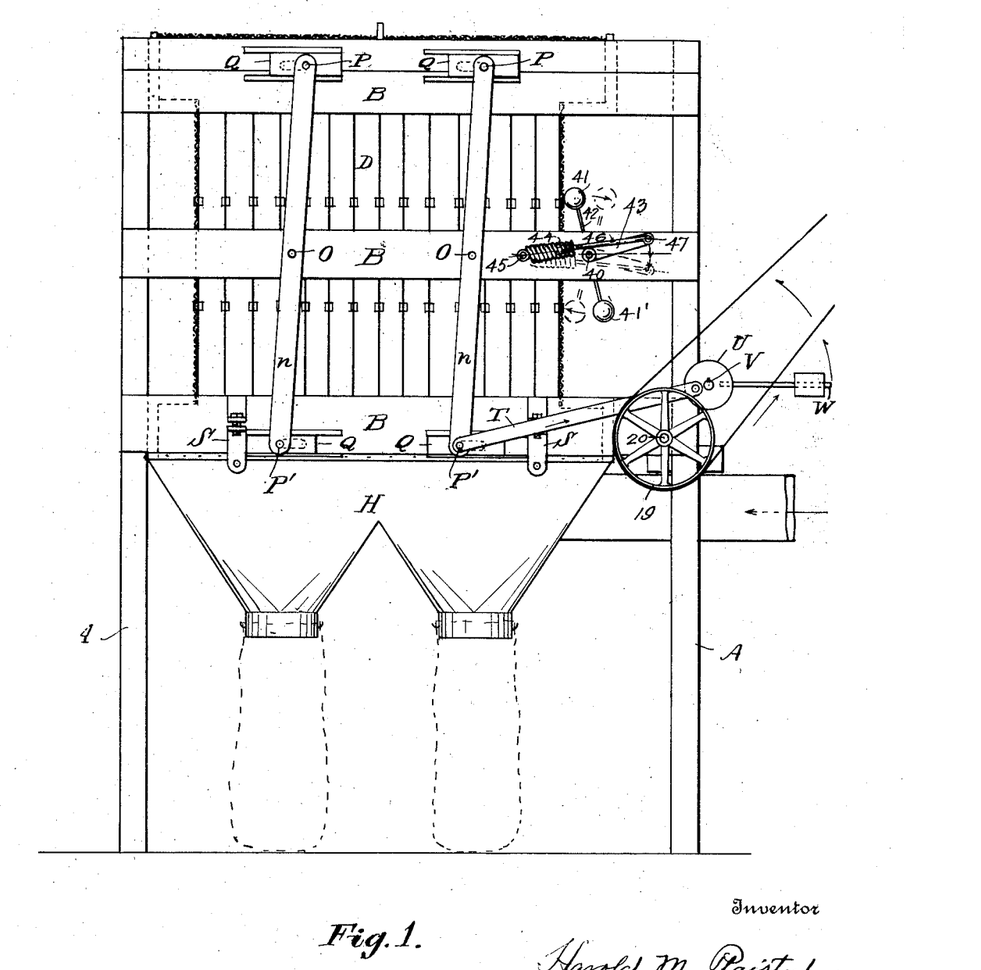
Figure 1 represents a side view of a dust collector embodying my invention; shown as constructed for using a pressure system in which the right hand front wall and left hand back wall, and the top, are screened.
Figure 3:
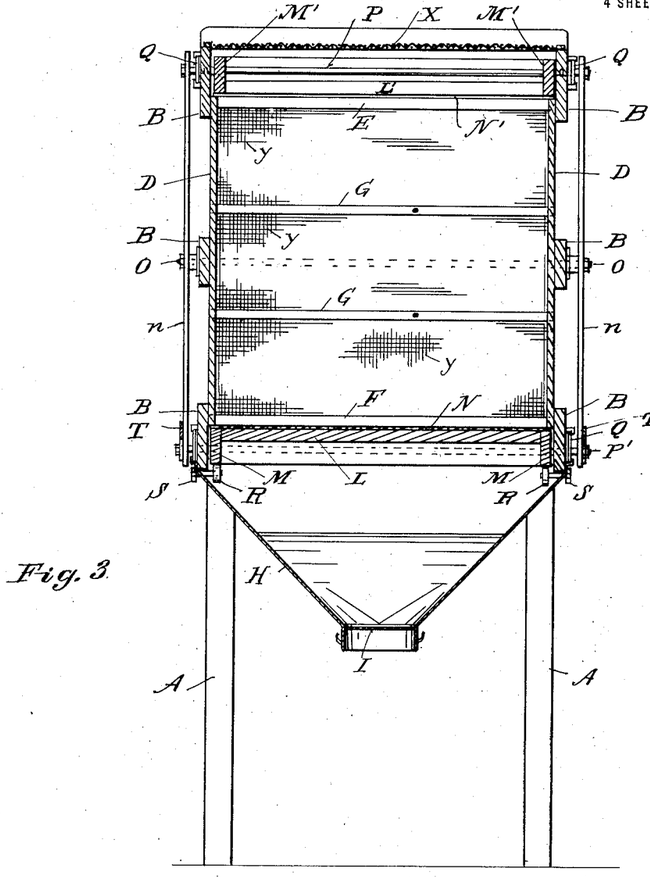
Fig. 3 a transverse sectional elevation of said collector taken on the line 2—2 of Fig. 2; and without a hood like Fig. 1.
Figure 4:
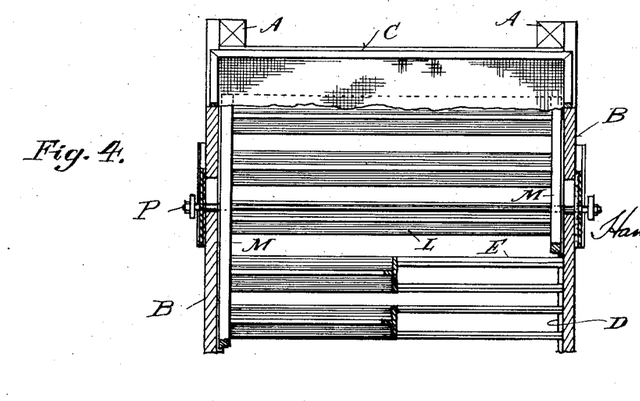
Fig. 4 a plan view of one end of the same partly broken away to show the construction below the screen top.

I have provided operative means for said valves preferably consisting of parallel levers n, center pivoted at o to the center side rail B on each side of the casing and secured pivotally by their ends to rods P passing through the upper valve and P' passing through the lower valve. Said rods are preferably extended outside of the casing and operate in slots in the side rails long enough to match the throw of said valves, and protected by closing plates Q and felt packing as shown in Figs. 1 and 3. The bottom valve is preferably supported by rollers R carried by adjustable hangers S as shown in Fig. 1. (In Fig. 3 the hanger is broken away to avoid hiding the closing plate adjacent.) These parallel levers, thus pivoted at the center and fastened to parallel valves at their upper and lower ends, operate said valves like a parallel ruler and in opposite horizontal directions simultaneously; that is, the lower valve will be moved to the right at the same time the upper valve is moved to the left as indicated by dashed lines in Fig. 2, and vice versa.

To secure uniform operation of said valves a link T on each side of the casing connects the adjacent lever n with a crank disk U mounted on a cross shaft V supported by the standards A. In order to operate said valves it is only necessary to rotate this crank shaft a suitable distance depending on the throw of the valves, and this may be done by hand, acting on a weighted lever W Fig. 1, engaging one or both of the crank disks U. The weight on said lever maintains the valves at the end of their throw. By raising the lever in the direction of the arrow Fig. 1, the weight will be carried to the other side of the crank shaft V and the valves will be shifted in opposite directions. As shown, the width of the bars L is equal to two pairs of cross strips F and the intermediate space, it may be greater in practice, as mentioned later.

The crank shaft V makes a half rotation as a maximum to effect the shift or throw of the valves from the ends of alternate passages to the next adjacent passages. The shift of the valves may take place in a fraction of a second. The end cross strips E and F are preferably in pairs to support ends of the screens, and if the horizontal width of each pair is equal to the space between adjacent pairs; the lower valve will open alternate inlets at the same instant the upper valve closes the outlets of the same passages; but some dust laden air may escape the outlet valve before it closes, and therefore I provide a top screen X secured to the top rails. The screen is shown in the sectional views by dot and curved lines and in the face views by crossed lines as usual. This upper screen X also serves to catch the lightest particles of dust that after being shaken off by the reverse currents may be taken up again by said reverse current coming through the screen, instead of falling with the balance of the dust to the grid at the bottom of the passage. However, the air currents are not as capable of picking up again and carrying the dust after they have passed through the screen, as when the dust-charged currents first approach the screen, deposit their load thereon and pass through the mesh to the other side. The greater part of the dust previously deposited will be shaken off the screen by the reverse currents and fall to the bottom of the passage, while any particles that are so light as to be taken up again will be caught by the upper screen X.

In practice, a lap and lead on the inlet and outlet valve bars similar to the lap and lead on sliding D-valves of engines, is advisable to close the outlet ends an instant or more before the inlet ends of the same passages are opened. The outlet bars L' at the top may thus be wider than the lower inlet bars L, whereby the upper bars will close the next adjacent outlets before the lower bars will open fully the corresponding inlet ends, and the upper bars will likewise lag behind the lower bars in opening the outlets now showing closed. It is evident that the upper bars may be made so much wider than the lower bars that a perceptible time interval may be caused in the closing of the next outlet before the opening of the same inlet passage. This action will assist the blown-off dust in dropping as desired into the hopper. Adjustable screws 4 limit the throw of said valves. The top rail is divided and the upper section is removable to give access to the upper valve and top screen. In a suction system in which the air is drawn through the filter house by suction the exit opening of the hood K is connected to an exhaust fan (not shown), and the front and back walls are air tight as shown at Y Y' Fig. 2, forming a close casing; but in a pressure or blast system, the said walls may be screen as shown in Figs. 1 and 3. In the latter case the hook K may be omitted or may be retained if desired.

The pairs of cross strips E F and G stiffen the reticular partition; other means may be used. The screens may be of any coarseness or fineness; hence they may serve to separate relatively coarse particles of air carried material from the relatively fine particles that pass through the screen interstices.

The valve operative mechanism comprising the levers n, connecting links T, cranks and crank shaft V, may be actuated by hand as before described; it is desirable however to provide automatic actuating mechanism that will throw the valves at regular intervals, and I therefore provide a bevel pinion 5 on said crank shaft, and a trip mechanism to actuate said valve operative mechanism.

Figure 7:
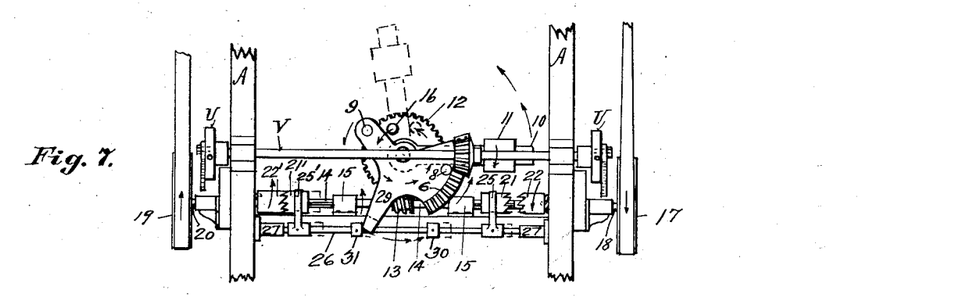
Fig. 7 a similar view to Fig. 5 showing the arrangement of the parts after shifting the valves.
Figure 8:
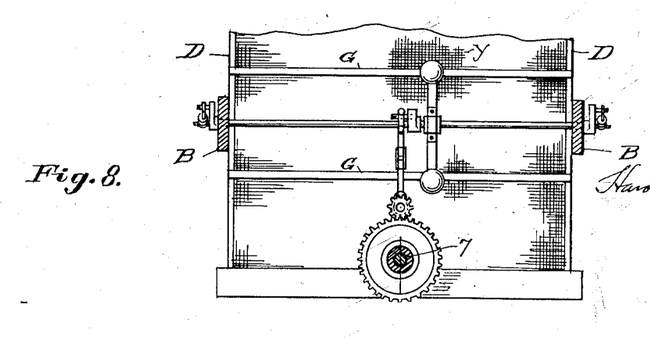
Fig. 8 a front view of the jarring mechanism on a sectional plane 3—3 of Fig. 2 but showing a front screen wall for a blast system instead of an air tight wall as in Fig. 2 which is for a suction system.

This trip mechanism comprises a gear segment 6 matching said pinion, and mounted on a cross shaft 7, the axis of which intersects the crank shaft V. This gear segment has gear teeth sufficient to rotate the bevel pinion and crank shaft half a rotation at a maximum, whereby to shift the valves as before described. It is provided on the back with two projections or shoulders located on opposite sides of the shaft axis 7, and designated 8 and 9 respectively. When the segment is in the positon shown by Fig. 5, the projection 9 supports horizontally a trip lever 10 having an adjustable weight 11 and pivotally mounted loosely on said shaft 7, so as to be rotatable in the direction of the arrow Fig. 5, to a corresponding horizontal position on the opposite side of the shaft 7. This rotation is effected by an actuating mechanism that will lift the trip lever to a vertical position, and then, as it passes the vertical, allow it to fall with gravitating momentum and engage the pin 8 and rotate the gear segment and meshing pinion and crank shaft half a revolution, or a definite part of a half revolution as a maximum. The pin or projection 8 will be carried downward with the segment, till said projection is below the horizontal plane when the trip lever is at its second horizontal position as shown in Fig. 7. The projections 8 and 9 in Fig. 7 are respectively opposite in their location as now shifted by the trip lever, to the location shown in Fig. 5 when the trip lever was at its starting position. It is only necessary now to provide an actuating mechanism for the trip mechanism to actuate said trip lever.

This actuating mechanism comprises a worm gear 12 mounted on said shaft 7 and rotated by a worm 13 mounted on a worm shaft 14 carried in bearings 15 and adapted to be driven in both directions by a driving mechanism to be presently described. The rotation of said worm and shaft will effect a slow rotation of said worm gear, comparatively. The worm gear is provided with a pin 16, or other suitable projection from the face of the gear into the path of the trip lever 10, and on a lesser radius than the projections 8 and 9 from the back of the gear segment. When the worm shaft 14 is rotating in the direction of the arrow Fig. 5, and the pin 16 is at its starting position in said figure the worm gear 12 will rotate and carry the pin 16, in the direction of the arrow, downward and then around under into engagement with the trip lever 10 resting on the segment shoulder 9. Continuing the worm gear rotation after the pin 16 engages the trip lever, will raise the latter to a vertical position and past the vertical as shown by dashed lines, till the weight causes said lever to gravitate downward into engagement with the opposite gear shoulder 8 and trip the segment as before described. The action of the worm and worm gear are comparatively slow, while the action of the trip mechanism when the weighted trip lever falls and throws or trips the gear segment, is comparatively quick, and therefore the rotative action of the crank shaft and the throw of the valves is likewise quick in action. It is only necessary to provide a driving mechanism in both directions for said worm shaft, in order to effect the forward and backward rotation of the worm gear and therefore lift the trip lever to actuating position on both sides of a vertical plane through the shaft 7. Thus while Fig. 5 shows the worm pin 16 rotating in the direction of the arrow and lifting the trip lever from its left hand position to its dashed position, the Fig. 7 shows the said worm gear rotating in a reverse direction and lifting the trip lever to a dashed position from which it will actuate by gravitating momentum, the trip segment and valve operative mechanism, through its engagement with the projection 9 Fig. 7.

This driving mechanism preferably consists of a shaft and pulley at each end of, and alined with said worm shaft, and driven in opposite directions by open and crossed belts to a countershaft (not shown).

Figure 5:
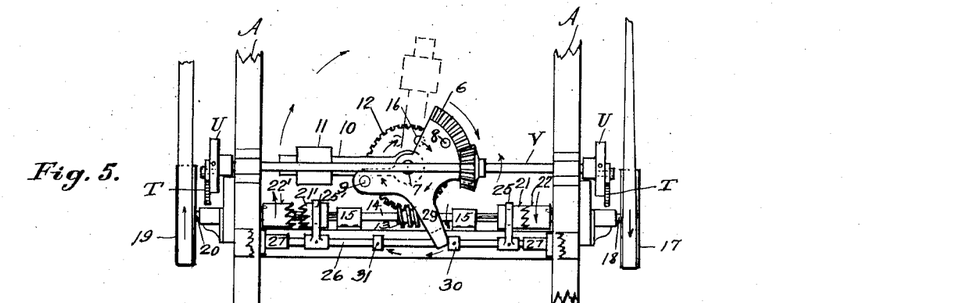
Fig. 5 a front elevation of a part of the collector and the automatic operating attachment heretofore mentioned.

The driving pulley 17 on a shaft 18 rotating in the direction of the arrow Figs. 5 and 7, is operably connected to the worm shaft 14. Likewise a pulley 19 on its shaft 20 at the opposite end of the worm shaft 14, is rotated in a reverse direction as indicated by the arrow in Figs. 5 and 7. These driving pulleys and shafts on which they are mounted in suitable bearings, rotate continuously in the direction indicated, and it is only necessary to provide operable connections between said driving shafts alternately, to produce the required alternate rotation of the worm shaft, worm and worm gear, and corresponding reversing action, or forward and backward action, upon the mechanism controlled thereby.

Figure 6:
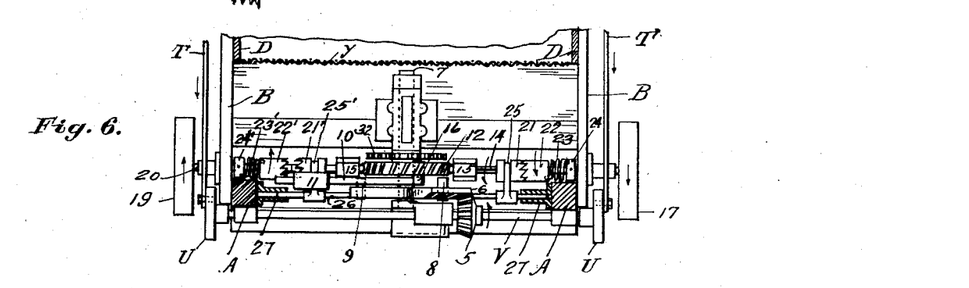
Fig. 6 a plan view of the same with the jarring mechanism removed and the front wall showing a screen for a blast system.

This operable connection preferably consists of a pair of clutches at each end of the worm shaft and alternately opened and closed by suitable shifting mechanism which will be operated simultaneously with the trip mechanism before mentioned. As shown in Fig. 5, a sliding clutch collar 21 mounted on a feather key at the right hand end of shaft 14, is engaged by a matching clutch collar 22 on the adjacent end of shaft 18, and thereby effects the desired rotation of the worm shaft in the direction of the arrow Fig. 5. The corresponding clutch collar 21′ at the opposite end of worm shaft 14 is disengaged from its matching clutch collar 22′ on the adjacent end of driving shaft 20 Fig. 5. Fig. 6 shows the mechanism in plan view with the parts in similar position to Fig. 5; and in Fig. 6 a flexible connection is shown between the driving clutch face 22 and its shaft, which preferably consists of a coil spring 23 wound on the shaft 18 and having the end of the spring engaging a fast collar 24 at one end and said clutch collar 22 at the other. The collar 22 being loose on the shaft 18 will thus be driven through a flexible connection with the driving shaft 18. A similar construction is provided at the other end of the worm shaft by a corresponding coil spring 23′ forming a flexible connection between a fast collar 24′ and clutch collar 22′, to afford flexible driving action between the driving shaft 20 and clutch face 22′.

A shifting mechanism for said opposing clutch faces at opposite ends of the worm shaft, preferably consists of yokes 25 and 25′ respectively engaging the collars 21 and 21′, slidably mounted on the said worm shaft. These yokes are carried by a shift shaft 26 slidably mounted in suitable bearings 27 carried by the posts A as shown in Fig. 6, and shifted to the right and the left alternately by suitable connection with the trip segment. This connection is preferably in the form of an arm 29 extending downward from the axis of said segment, and at right angles to a line of centers between the projections 8 and 9. The bottom end of said arm 29 is divided to form an inverted U spanning the shifter rod 26, adapted to engage alternately with collars 30 and 31 fastened to said shifter a suitable space apart. As shown in Fig. 5, the arm 29 has just completed the shifting action by throwing the shifter rod and collar 30 to the position shown. As the backward rotation proceeds under the trip action of the trip lever upon the projection 8 of the gear segment, the arm 29 will be driven quickly to the left in the direction of the arrows Fig. 5, and near the end of its stroke, it will engage the collar 31 and throw the shift rod 26 a suitable distance to the left, and thereby disengage clutch faces 21 and 22 which will stop the rotation of the worm shaft in the direction shown in Fig. 5; and the completion of the motion of the shifter will engage the clutch faces 21' and 22" and cause a reverse direction of the worm shaft as shown in Fig. 7. It will be observed that this shifting action is comparatively slight, and that the effective movement occurs near the end of the rotation of the gear segment when the trip lever is acting with its greatest gravitating force; the shifting action of the mechanism upon the valves is nearly completed therefore, and the comparatively greater gravitating force of the trip lever will be exerted to break the clutch engagement of the engaged clutch pair actually driving the worm shaft and connected mechanism. That is to say, the clutch disengagement takes place at the most effective potential position of the trip lever.

The disengagement of the clutch faces at the left in Fig. 7, is effected by the reverse action of the arm 29 upon the fast collar 30 as indicated in said figure.

It is desirable to effect a jarring of the reticular partitions at frequent intervals while the screening action is taking place, and I have therefore provided a jarring mechanism operably connected to the automatic mechanism for the valves, and preferably comprising a gear wheel 32 keyed upon the hub of the worm gear 12, or otherwise actuated, and meshing with a pinion 33 mounted on a crank shaft 34 carried by a bearing 35. The crank 36 is connected by a link 37 preferably adjustable in length, and having a slot at the opposite end from the crank in which is mounted the pin 38 of a trip crank 39 carried by a cross shaft 40 horizontally disposed adjacent to the front wall or reticular partition. On said shaft 40 is mounted a double headed hammer the heads of 41 and 41' being carried by arms 42 that are preferably flexible to increase the rapping effect upon the reticular partitions by a quick snapping action due to a trip device for the shaft 40.

This trip device comprises a spring-operated crank 43 at each end of said shaft 40 and preferably on the outside of the cross rails B carrying said shaft. A spring 44 has one end pivotally fastened at 45 in the horizontal plane through the axis of said shaft 40 and connected at the other end by an eye bolt 46 having an eye in one end for mounting on the crank pin 47 of said crank 43 and a threaded connection with a nut engaging the end of said spring 44 whereby the length of this connection is varied and the strength of the spring action is likewise varied. As shown in Fig. 1 the crank 43 extends in the opposite direction from the spring 44 and the tension of said spring will act upon the crank 43 to pull it to one side or the other of the horizontal plane through the shaft 40 and the spring pivot 45 and likewise rotate accordingly, the shaft 40 carrying the double hammer. The said link 37 forming a slotted link connection between the trip crank 39 and the pinion crank 36, will pull down the trip crank till the said crank is in a horizontal plane, and the spring-operated crank 43 is likewise in a horizontal plane, and the spring 44 at each end of the shaft 40 is therefore pulling in the same plane through the center of the shaft 40. As soon as the pinion crank pulls the trip crank past the central plane, the springs 44 will act through their spring operated cranks upon the shaft 40, and pull or rotate the shaft 40 with a snap to the lower position of said trip crank and spring operated cranks, and thereby bring the lower hammer head 41' with a snap against the lower of the two pairs of cross bars intermediate of the ends of the screens.
The pinion crank has made a half revolution downward with regular motion but the slotted connection of the trip crank pin 38 with the end of the link 37, allows the trip crank and its shaft carrying the jarring hammer to act with the desired snapping action upon the screens.

As the pinion crank turns upward the link 37 is raised and the trip crank and its shaft is rotated till the pin 38 passes the horizontal plane, when the snapping action of the heads will be effected and the head 41 will be brought into contact with the adjacent cross bar or other portion of the adjacent screen.
As shown in Fig. 2, each pair of cross bars G is connected to the adjacent pair in the next screen by a pin projection 48 or other interposed extension from one pair of cross bars G to the next adjacent. This extension may be secured centrally at each of the two adjacent pairs of cross bars, but preferably is secured to but one pair and extends over nearly to the next pair in a horizontal plane so that a slight clearance is left at one end of the pin 48 and the adjacent cross bar—or bare contact is made for said bar—so that when the hammer head 41 strike the first partition the screen is jarred and the jar is delivered in succession to the adjacent screens instead of the jar being given to all of the screens at the same instant. By this preferred construction a better jarring effect is secured upon the screens and a lesser blow required than if the screens were rigidly connected and moved as one.

When the front partition is a reticular partition as in Fig. 1, the hammer heads may engage with their adjacent cross bars G directly; but when a solid partition or

I claim:

1. A dust collector comprising walls, a series of screens and screen supports,—each screen having a passage on each side of it and forming a reticular partition between adjacent passages,—and means to close temporarily the outlet end of alternate passages and open the inlet end of the same passages.

2. A dust collector comprising walls, a series of screens and screen supports,—each screen having a passage on each side of it and forming a reticular partition between adjacent passages,—and movable means to close temporarily the outlet end of alternate passages and open the inlet end of the same passages, and vice versa.

3. A dust collector comprising inclosing walls forming a casing with entrance and exit openings and subject to air suction, a series of screens and screen supports,—each screen having a passage on each side of it and forming a reticular partition between such adjacent passages,—said passages being interposed between said entrance and exit openings of the casing and connecting them,—and means located at the inlet and outlet ends of said passages to close temporarily alternate inlet ends of said passages and open alternate outlet ends of the same passages, and vice versa.

4. A dust collector comprising inclosing walls, and an intermediate reticular partition substantially parallel to said walls and forming through passages open at both ends and subject to dust laden air current passing through said passages, and means to close temporarily the outlet end of one passage and simultaneously close the inlet end of the other passage, and then to alternate and close the inlet end of the first named passage and the outlet end of the other passage whereby the dust laden air is directed alternately to both sides of said reticular partition and a continuous action of the dust laden air is effected without materially checking its current.

5. In a dust collector the combination with walls and reticular partitions forming passages, valves controlling the inlet and outlet ends of said passages. and a bevel pinion operably connected to said valves, of a trip mechanism comprising a segment gear meshing with said bevel pinion and having projecting shoulders on the back diametrically disposed, and a gravitating trip lever loosely pivoted on the same axis and engaging said shoulders of the segment gear alternately to rotate said pinion in both directions, and actuating mechanism for said trip lever.

6. In a dust collector the combination with walls and reticular partitions forming passages, valves controlling the inlet and outlet ends of said passages, operative means for said valves, and a trip mechanism for said operative means comprising a gravitating lever, of actuating mechanism comprising a worm gear on the same axis with said lever and having a projecting pin in the path of said lever, and a worm shaft and worm meshing with said worm gear, and driving mechanism for said worm shaft in both directions.

7. In a dust collector the combination with walls and reticular partitions forming passages, valves controlling said passages, operative means for said valves, a trip mechanism for said operative means and actuating means comprising a worm shaft, of driving mechanism comprising a shaft and pulley at each end of and alined with said worm shaft and driven in opposite directions, a clutch connection between each end of the worm shaft and the respective pulley shaft, and a shifting mechanism operably connected to said trip mechanism for operating said clutch connections alternately.

8. In a dust collector, the combination with valves and operative mechanism comprising a bevel pinion, of a trip mechanism consisting of a segment gear meshing with said pinion and having projecting shoulders and a trip arm radially disposed intermediate of said shoulders, a trip lever alternately engaging said shoulders, means to actuate said lever, and a shift mechanism actuated by said trip arm.

9. A dust collector and its operative mechanism comprising a worm shaft, driving shafts abutting the ends of said worm shaft, a clutch mechanism between each driving shaft and the adjacent end of the worm shaft and consisting of a pair of clutch collars,—one collar being feather keyed to its shaft for sliding adjustment, and the other collar being rotatably mounted on its shaft,—a fixed collar on the latter shaft, a coil spring connection between said fixed collar and rotatable collar, and means to effect the adjustment of said sliding collars.

In testimony whereof I have affixed my signature.

HAROLD M. PLAISTED.

It is hereby certified that Letters Patent No. 1,356,086, granted October 19, 1920, upon the application of Harold M. Plaisted, of St. Louis, Missouri, for an improvement in "Dust-Collectors," were erroneously issued to Williams Patent Crusher and Pulverizer Company, as assignee of the entire interest in said invention, whereas said Letters Patent should have been issued to the inventor, said *Plaisted and Williams Patent Crusher and Pulverizer Company*, said corporation being assignee of forty-nine one-hundredths only, as shown by the record of assignments in this office; and that the said Letters Patent should be read with this correction therein that the same may conform to the record of the case in the Patent Office.

Signed and sealed this 7th day of December, A. D., 1920.

[SEAL.]

L. B. MANN,
*Acting Commissioner of Patents.*

Cl. 183—52.